(12) United States Patent
Atkinson et al.

(10) Patent No.: US 8,465,089 B2
(45) Date of Patent: Jun. 18, 2013

(54) ROCKER MOLDINGS FOR VEHICLES

(75) Inventors: Aaron W. J. Atkinson, Glendale, AZ (US); Peter Kim, Northville, MI (US); David Takeo Nakayama, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 124 days.

(21) Appl. No.: 13/234,484

(22) Filed: Sep. 16, 2011

(65) Prior Publication Data

US 2013/0069396 A1    Mar. 21, 2013

(51) Int. Cl.
*B60N 99/00* (2006.01)

(52) U.S. Cl.
USPC .......................................................... 296/209

(58) Field of Classification Search
USPC ......... 296/209, 181.2, 29, 35.1, 1.08, 901.01, 296/193.05; 293/128
See application file for complete search history.

(56) References Cited

U.S. PATENT DOCUMENTS

| | | | |
|---|---|---|---|
| 5,443,297 A | 8/1995 | Tanaka et al. | |
| 5,671,967 A | 9/1997 | Gurganus et al. | |
| 5,700,049 A | 12/1997 | Shibata | |
| 6,077,576 A | 6/2000 | Osborn | |
| 6,354,656 B1 | 3/2002 | Hwang | |
| 7,168,757 B2 | 1/2007 | Futatsuhashi | |
| 7,234,764 B2 | 6/2007 | Aizawa et al. | |
| 7,523,982 B2 | 4/2009 | Yamaguchi | |
| 7,850,229 B2 | 12/2010 | Ihashi et al. | |
| 8,262,154 B2 * | 9/2012 | Garnett et al. | 296/199 |
| 2006/0001294 A1 | 1/2006 | Balgaard et al. | |
| 2006/0066139 A1 * | 3/2006 | Futatsuhashi | 296/209 |
| 2009/0261622 A1 | 10/2009 | Rill et al. | |
| 2010/0109385 A1 | 5/2010 | Yamada et al. | |

* cited by examiner

*Primary Examiner* — Lori Lyjak
(74) *Attorney, Agent, or Firm* — Dinsmore & Shohl LLP (57) ABSTRACT

A rocker molding for attachment to a rocker panel of a vehicle includes a rocker garnish with an arcuate cross section. A garnish shelf extends from an upper edge of the rocker garnish such that the garnish shelf is substantially perpendicular to the rocker garnish. A riser portion extends from an inboard edge of the garnish shelf in a substantially vertical direction. A cap shelf extends from a top edge of the riser portion in an inboard direction. When the rocker molding is installed on the rocker panel of the vehicle, the garnish shelf extends from the rocker panel in an outboard direction, the riser portion is substantially flush with a skin of a vehicle door when the door is in a closed position, and a bottom edge of the vehicle door is spaced apart from the garnish shelf by at least a height H of the riser portion.

20 Claims, 9 Drawing Sheets

ROCKER MOLDINGS FOR VEHICLES

TECHNICAL FIELD

The present specification generally relates to moldings for vehicles and, more specifically, to rocker moldings for vehicles.

BACKGROUND

Vehicles may contain rocker panels that are located below the vehicle doors. The rocker panels may cover the sides of the vehicle frame and may be covered by a rocker molding. In certain conditions, ice and/or snow may accumulate on the rocker moldings, adjacent to the lower edge of the car doors. Such accumulated ice and/or snow may impede the opening of the vehicle door, thereby making it more difficult for an occupant of the vehicle to exit the vehicle or for a person outside of the vehicle to enter the vehicle. In order to open a door inhibited by such ice/snow accumulation on some rocker moldings, a great deal of shear force may be required to break the bond between the ice and the rocker molding. The shear force required to break the bond between the ice and the rocker molding is typically greater than the shear force required to break the ice itself.

Accordingly, a need exists for alternative structures of vehicle rocker moldings which do not substantially inhibit the opening of a vehicle door when ice an/or snow accumulates on the rocker molding.

SUMMARY

In one embodiment, a rocker molding for attachment to a rocker panel of a vehicle may include a rocker garnish with an arcuate cross section. A garnish shelf may extend from an upper edge of the rocker garnish such that the garnish shelf is substantially perpendicular to the upper edge of the rocker garnish. A riser portion may extend from an inboard edge of the garnish shelf in a substantially vertical direction. A cap shelf may extend from a top edge of the riser portion in an inboard direction. When the rocker molding is installed on the rocker panel of the vehicle, the garnish shelf may extend from the rocker panel in an outboard direction, the riser portion may be substantially flush with a skin of a vehicle door when the door is in a closed position, and a bottom edge of the vehicle door may be spaced apart from the garnish shelf by at least a height H of the riser portion.

In another embodiment, a vehicle may include a vehicle door, a rocker panel, and a rocker molding for attachment to the rocker panel of the vehicle. The rocker molding may include a rocker garnish with an arcuate cross section. A garnish shelf may extend from an upper edge of the rocker garnish such that the garnish shelf is substantially perpendicular to the upper edge of the rocker garnish. A riser portion may extend from an inboard edge of the garnish shelf in a substantially vertical direction. A cap shelf may extend from a top edge of the riser portion in an inboard direction. When the rocker molding is installed on the rocker panel of the vehicle, the garnish shelf may extend from the rocker panel in an outboard direction, the riser portion may be substantially flush with a skin of a vehicle door when the door is in a closed position, and a bottom edge of the vehicle door may be spaced apart from the garnish shelf by at least a height H of the riser portion.

In yet another embodiment, a vehicle may include a vehicle door, a rocker panel, and a rocker molding for attachment to the rocker panel of the vehicle. The rocker molding may include a rocker garnish with an arcuate cross section. A connector box may be pivotably attached to a lower edge of the rocker garnish for movement relative to the rocker garnish. A garnish shelf may extend from an upper edge of the rocker garnish such that the garnish shelf is substantially perpendicular to the upper edge of the rocker garnish. A riser portion may extend from an inboard edge of the garnish shelf in a substantially vertical direction. A plurality of attachment tabs may be positioned on an inboard side of the rocker molding for attaching the rocker molding to the rocker panel of the vehicle. A cap shelf may extend from a top edge of the riser portion in an inboard direction. When the rocker molding is installed on the rocker panel of the vehicle, the garnish shelf may extend from the rocker panel in an outboard direction, the riser portion may be substantially flush with a skin of a vehicle door when the door is in a closed position, and a bottom edge of the vehicle door may be spaced apart from the garnish shelf by at least a height H of the riser portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
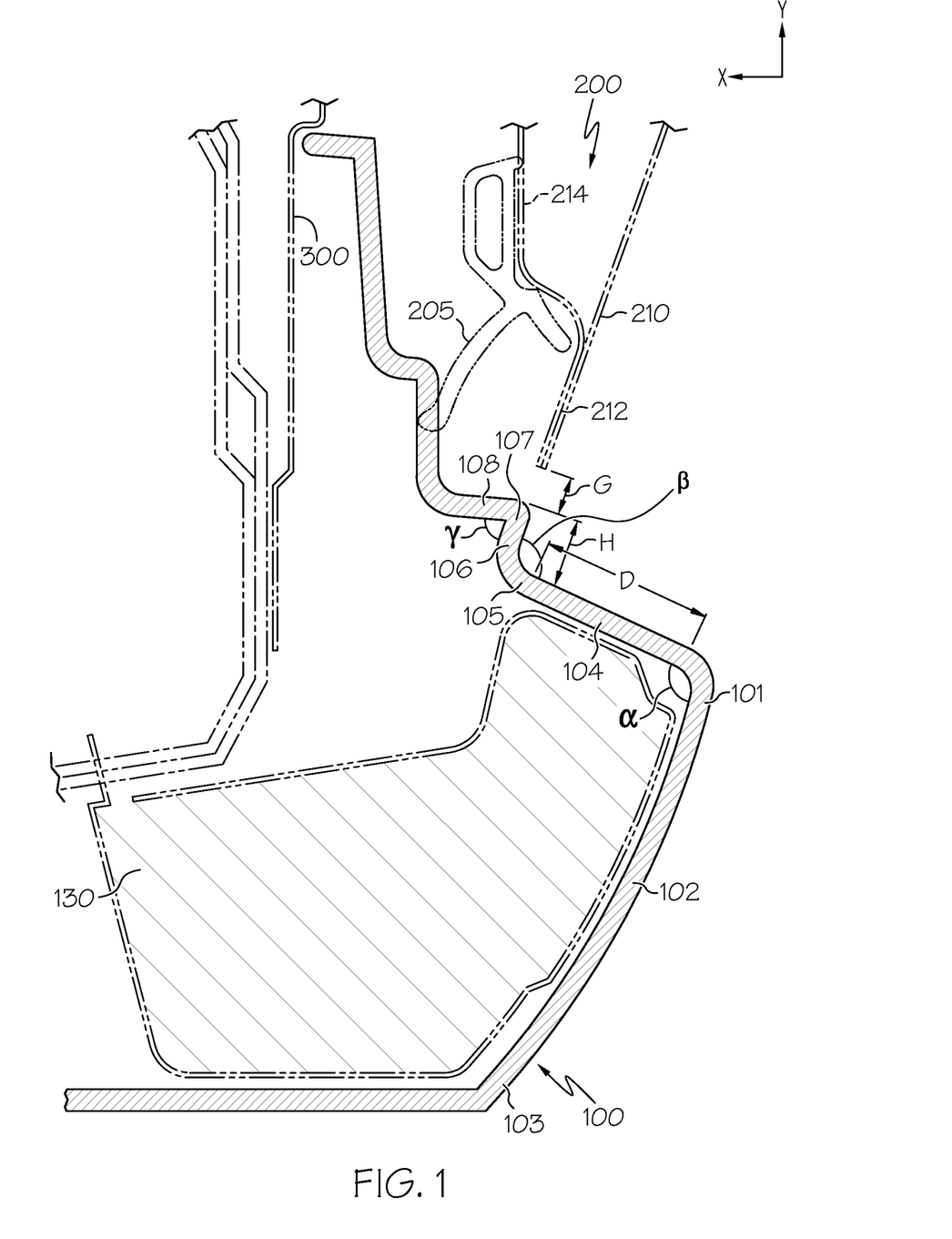
FIG. 1 schematically depicts a cross section of a rocker molding installed on a rocker panel of a vehicle when a door of the vehicle is in a closed position, according to one or more embodiments shown and described herein.

FIG. 1 generally depicts a cross section of one embodiment of a rocker molding for attachment to a rocker panel of a vehicle. The rocker molding may generally comprise a rocker garnish having an arcuate cross section, a garnish shelf, a riser portion, and a cap shelf. The garnish shelf extends from an upper edge of the rocker garnish such that the garnish shelf is substantially perpendicular to the upper edge of the rocker garnish. A riser portion extends from an inboard edge of the garnish shelf in a substantially vertical direction. A cap shelf extends from a top edge of the riser portion in an inboard direction. When the rocker molding is installed on the rocker panel of the vehicle, the garnish shelf extends from the rocker panel in an outboard direction, the riser portion is substantially flush with a skin of a vehicle door when the door is in a closed position, and a bottom edge of the vehicle door is spaced apart from the garnish shelf by at least a height H of the riser portion. Various embodiments of the rocker molding will be described in more detail herein with specific reference to the appended drawings.

Coordinate axes are included in some of the drawings in order to provide a frame of reference for various components of the rocker moldings. As used herein, "above" is defined as the positive y direction of the coordinate axes shown in the drawings. "Below" is defined as the negative y direction of the coordinate axes shown in the drawings. "Inboard" is defined as the positive x direction of the coordinate axes shown in the drawings. "Outboard" is defined as the negative x direction of the coordinate axes shown in the drawings. "Forward" is defined as the positive z direction of the coordinate axes shown in the drawings. "Rear" is defined as the negative z direction of the coordinate axes shown in the drawings.

Referring to FIG. 1, a cross section of one embodiment of a rocker molding 100 installed on a rocker panel 300 of a vehicle is schematically depicted. The rocker molding 100 generally comprises a rocker garnish 102, a garnish shelf 104, a riser portion 106, and a cap shelf 108. The rocker garnish 102 is generally arcuate in cross section. An upper edge 101 of the rocker garnish 102 extends above and outboard relative to a lower edge 103 of the rocker garnish 102. The cross-sectional thickness of the rocker molding 100 may be in the range of about 2.5 mm to about 3.5 mm. For example, in one embodiment, the cross-sectional thickness of rocker molding 100 is about 2.8 mm.

Still referring to FIG. 1, the garnish shelf 104 extends from the upper edge 101 of the rocker garnish 102 such that an inboard edge 105 of the garnish shelf 104 is above and inboard of the upper edge 101 of the rocker garnish 102. In some embodiments, a depth D of the garnish shelf 104 in the inboard direction is about 25 mm. The garnish shelf 104 is oriented at an angle α relative to the rocker garnish 102. The garnish shelf 104 is substantially perpendicular to the upper edge 101 of the rocker garnish 102. For example, in some embodiments, the angle α may be about 90°. The garnish shelf 104 is located outboard of the rocker panel 300 when the rocker molding 100 is installed on the rocker panel 300 of the vehicle. While the garnish shelf 104 is shown in FIG. 1 as being substantially perpendicular to the rocker garnish 102, it should be understood that the orientation of the garnish shelf 104, the orientation of the rocker garnish 102 and the angle α between the garnish shelf 104 and the rocker garnish 102 may vary. Moreover, the orientation of the garnish shelf 104, the orientation of the rocker garnish 102, and the angle α between the rocker garnish 102 and the garnish shelf 104 depend on the desired styling of the rocker molding.

Still referring to FIG. 1, the riser portion 106 extends from an inboard edge 105 of the garnish shelf 104 substantially above the inboard edge 105 of the garnish shelf 104. In some embodiments, a height H of the riser portion 106 is about 10 mm. The riser portion 106 is oriented at an angle β relative to the garnish shelf 104. Specifically, the riser portion 106 is substantially perpendicular to the inboard edge 105 of the garnish shelf 104. For example, in some embodiments, the angle β may be about 90°. While the riser portion 106 is shown in FIG. 1 as being substantially perpendicular to the garnish shelf 104, it should be understood that the orientation of the riser portion 106, the orientation of the garnish shelf 104 and the angle β between the garnish shelf 104 and the riser portion 106 may vary. Moreover, the orientation of the riser portion 106, the orientation of the garnish shelf 104, and the angle β between the garnish shelf 104 and the riser portion 106 depend on the desired styling of the rocker molding.

Still referring to FIG. 1, the cap shelf 108 extends from an upper edge 107 of the riser portion 106 in a substantially inboard direction relative to the upper edge 107 of the riser portion 106. The cap shelf 108 is oriented at an angle γ relative to the riser portion 106. Specifically, the cap shelf 108 is substantially perpendicular to the upper edge 107 of the riser portion 106. For example, in some embodiments, the angle γ may be about 90°. While the cap shelf 108 is shown in FIG. 1 as being substantially perpendicular to the riser portion 106, it should be understood that the orientation of the cap shelf 108, the orientation of the riser portion 106 and the angle γ between the riser portion 106 and the cap shelf 108 may vary. Moreover, the orientation of the cap shelf 108, the orientation of the riser portion 106 and the angle γ between the riser portion 106 and the cap shelf 108 depend on the desired styling of the rocker molding.

Still referring to FIG. 1, in some embodiments the rocker molding 100 may further comprise a foam insert 130 positioned in the rocker molding 100 adjacent to an inboard side of the rocker molding 100. The foam insert 130 prevents rocks, dirt, mud, and any other debris from accumulating in the interior of the rocker molding 100, thereby reducing potential noise that could result from debris within the rocker molding 100. The foam insert 130 may also increase the rigidity of the rocker molding 100, thereby reducing the likelihood of impact damage to the rocker molding 100. However, it should be understood that while some embodiments may contain a foam insert 130, other embodiments may be constructed without a foam insert 130.

Figure 2:
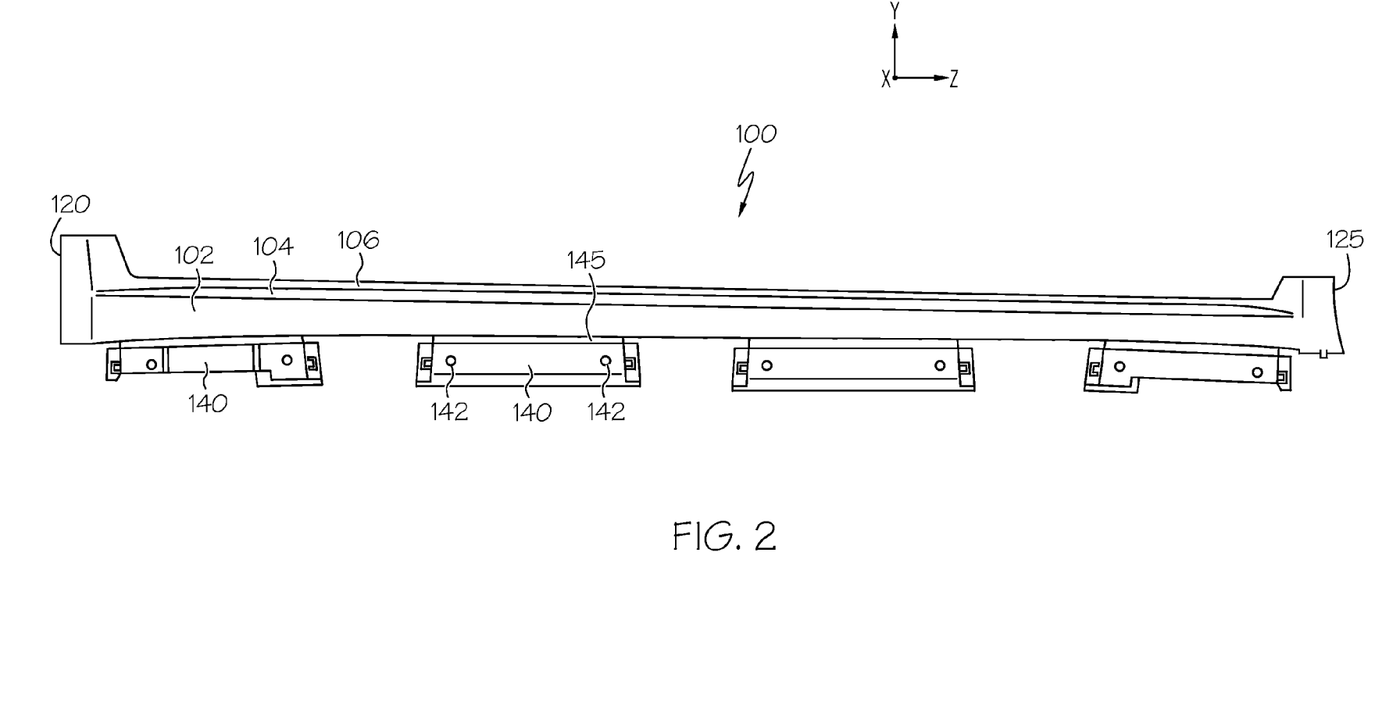
FIG. 2 schematically depicts an outboard side view of a rocker molding, according to one or more embodiments shown and described herein.

Referring now to FIG. 2, the outboard side of a rocker molding 100 is schematically depicted. As shown in FIG. 2, some embodiments of the rocker molding 100 may further comprise a first attachment flange 120 and a second attachment flange 125 which are positioned on opposite ends of the rocker molding 100. The rocker garnish 102 extends between the first attachment flange 120 and the second attachment flange 125, while the garnish shelf 104 extends at least partially between the first attachment flange 120 and the second attachment flange 125. Similarly, the riser portion 106 extends at least partially between the first attachment flange 120 and the second attachment flange 125.

Still referring to FIG. 2, in some embodiments, connector boxes 140 are pivotably attached to an underside of the rocker molding for movement relative to the rocker garnish 102. In one embodiment, a living hinge 145 pivotably attaches the connector boxes 140 to the underside of the rocker molding 100. The connector boxes 140 may comprise holes 142 which are used to attach the rocker molding 100 to a vehicle. In the embodiment shown in FIG. 2, the connector boxes 140 are shown in a pre-installation position before being rotated upward in order to attach the rocker molding 100 to a vehicle.

Figure 3:
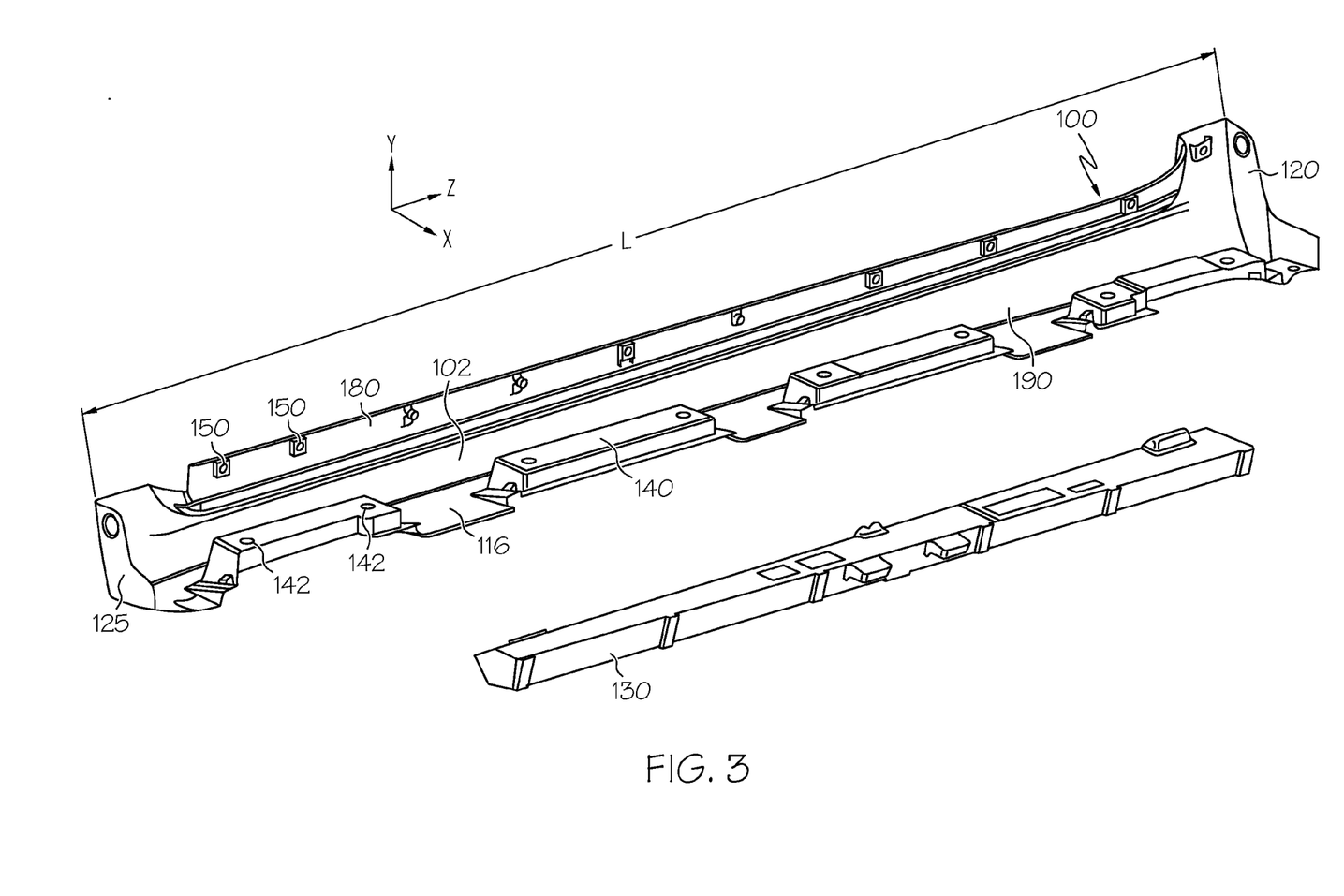
FIG. 3 schematically depicts an inboard side view of a rocker molding including a foam insert of the rocker molding, according to one or more embodiments shown and described herein.

Referring now to FIG. 3, the inboard side of the rocker molding 100 is schematically depicted with the foam insert 130 detached from the rocker molding. As depicted in FIG. 3, the first attachment flange 120 and the second attachment flange 125 are substantially perpendicular to a length L of the rocker garnish 102, which extends at least partially between the first attachment flange 120 and the second attachment flange 125.

Moreover, in the embodiment of the rocker molding 100 shown in FIG. 3, a plurality of attachment tabs 150 are coupled to an upper portion 180 of an inboard edge of the rocker molding 100. The plurality of attachment tabs 150 facilitate attaching the rocker molding 100 to a rocker panel of a vehicle, such as with clips, screws, or other fasteners. In the embodiment shown in FIG. 3, the connector boxes 140 are shown in an installation position rotated upward, in order to attach the rocker molding 100 to a rocker panel of a vehicle.

Still referring to FIG. 3, the foam insert 130 is depicted separate from the rocker molding 100. However, it should be understood that, when the rocker molding 100 is attached to a vehicle, the foam insert 130 will be inserted into a cavity 190 on the inboard side of the rocker molding 100, between the rocker garnish 102 and the connector boxes 140.

The rocker molding 100 described herein may be formed from metal, plastic, or composite materials. In the embodiments shown and described herein, the rocker molding 100 is formed by injection molding polymeric resin. However, it should be understood that other materials and other forming processes may be used to construct the rocker molding 100. In some embodiments, the rocker molding 100 may be formed as a unitary piece. For example, instead of being formed by injection molding, in some embodiments, the rocker molding 100 could be stamped or integrated into the vehicle frame. In other embodiments, the rocker molding 100 may comprise multiple pieces.

In the embodiments described herein, the rocker molding 100 is formed as a unitary piece by injection molding polymeric resin. Once the injection molding is complete, the rocker molding 100 may be finished by applying paint, or any other substance to the surface of the rocker molding 100. Multiple coatings may be applied to the surface of the rocker molding 100, in any order. The foam insert 130 may then be secured within the rocker molding 100. The assembly of the rocker molding 100 and the foam insert 130 may then be installed on the vehicle 500. A plurality of clips, screws, or both may be used to attach at least a portion of the rocker molding 100 to the body of the vehicle 500.

Figure 4:
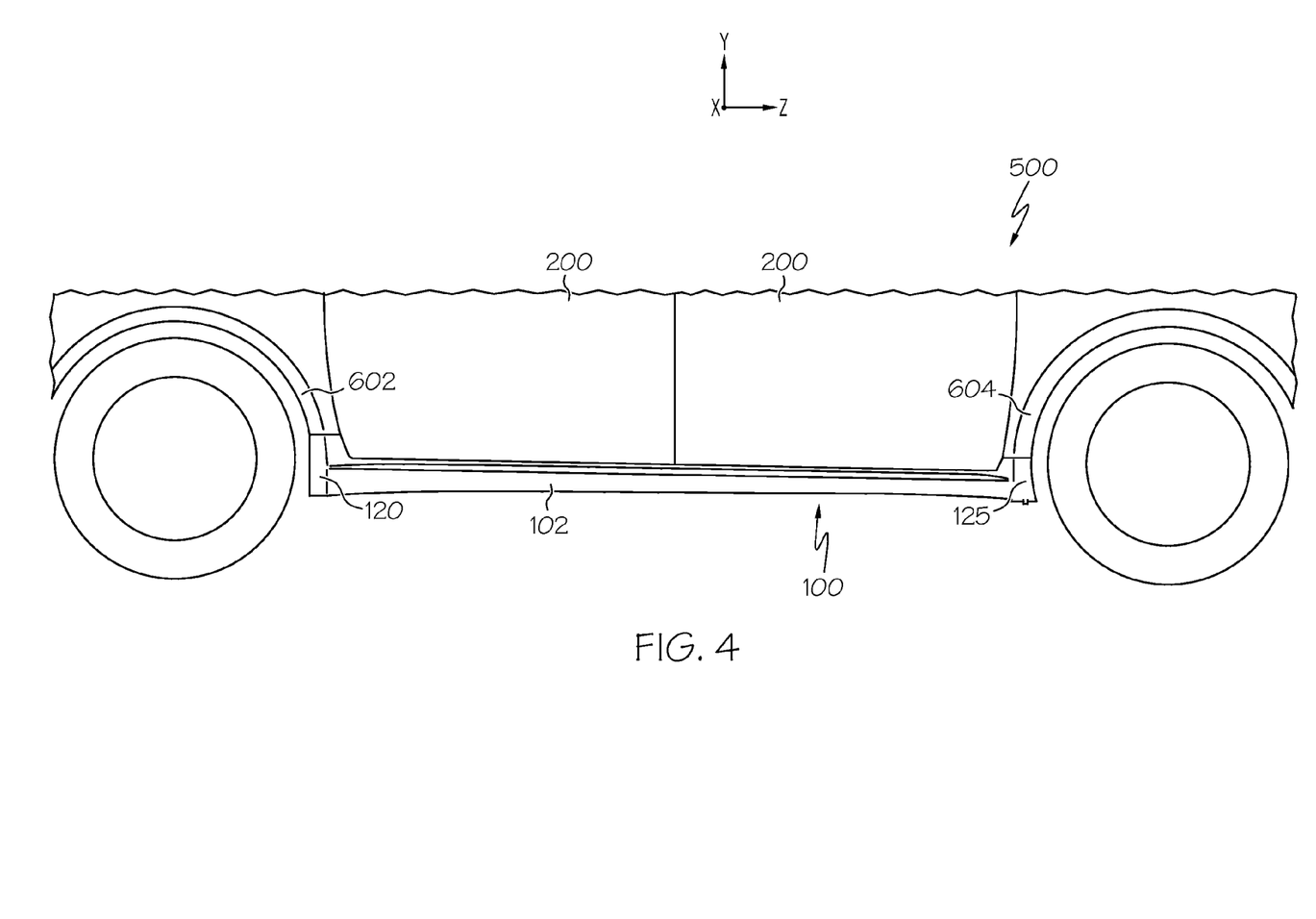
FIG. 4 schematically depicts a rocker molding installed on a vehicle, according to one or more embodiments shown and described herein.

Referring now to FIG. 4, a vehicle 500 is depicted with a rocker molding 100 installed on the rocker panel. The vehicle 500 comprises front and rear vehicle doors 200, a first wheel well 602, and a second wheel well 604. The rocker molding 100 is installed on the rocker panel of the vehicle 500 which is located below the front and rear vehicle doors 200 and between the first wheel well 602 and the second wheel well 604. The rocker garnish 102 extends between first attachment flange 120 and second attachment flange 125. The first attachment flange 120 is positioned in the first wheel well 602 and is attached to an interior surface of the first wheel well 602 with fasteners. The second attachment flange 125 is positioned in the second wheel well 604 and is attached to an interior surface of the second wheel well 604 with fasteners.

Figure 5:
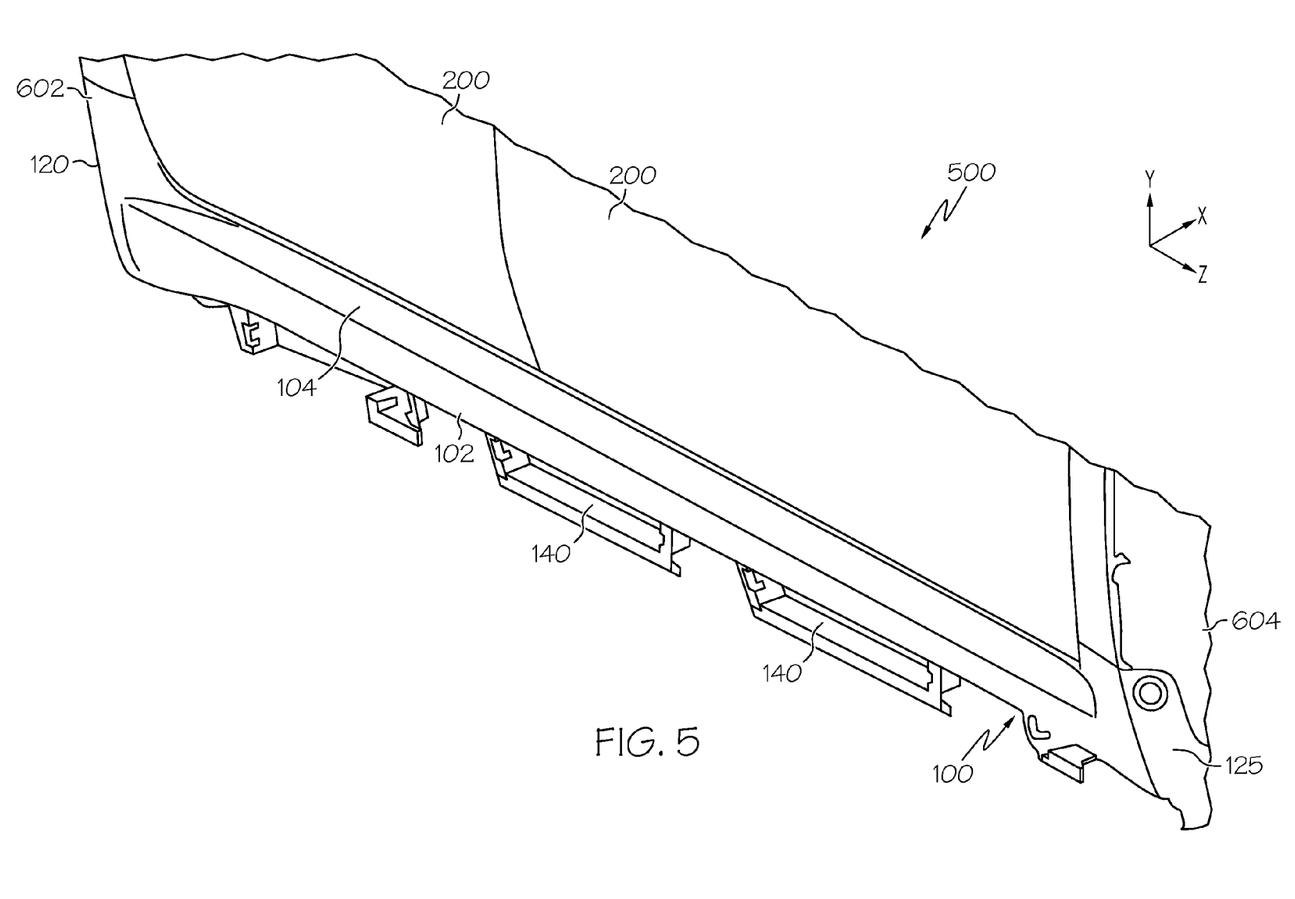
FIG. 5 schematically depicts a perspective view of a rocker molding installed on a vehicle, according to one or more embodiments shown and described herein.

Referring now to FIG. 5, a perspective view of a portion of a vehicle 500 comprising vehicle doors 200 is schematically depicted with a rocker molding 100 partially installed on the vehicle 500. The rocker molding 100 is oriented so that the first attachment flange 120 is positioned within the first wheel well 602 and the second attachment flange 125 is positioned within the second wheel well 604, as described above. The first attachment flange 120 and the second attachment flange 125 are fastened to an interior surface of the first wheel well 602 and the second wheel well 604, respectively. To complete the installation, the connector boxes 140 will be rotated inboard and upwards for attachment to the underside of the vehicle 500 with fasteners.

Figure 6A:
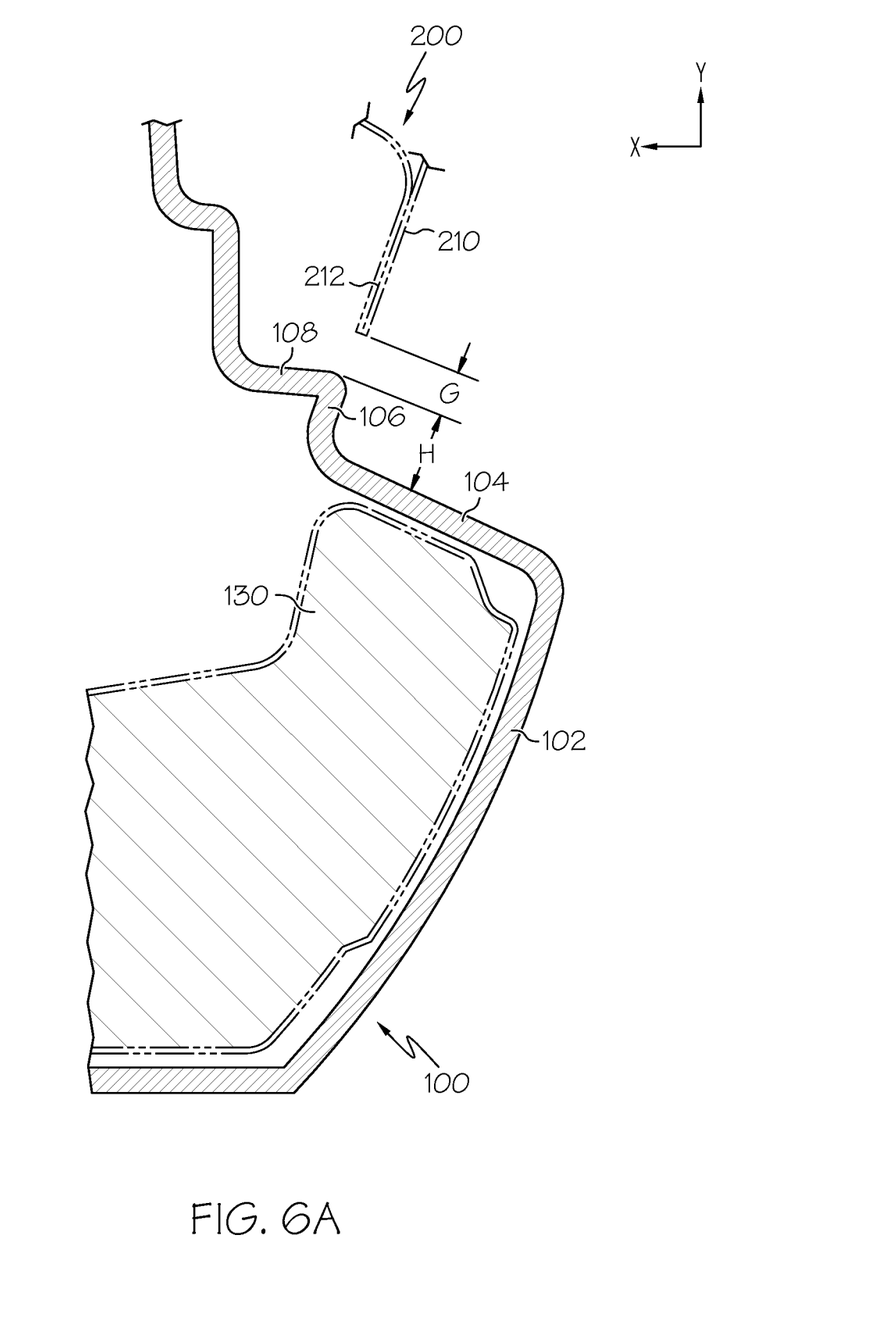
FIGS. 6A and 6B schematically depict cross sections of a rocker molding and a door skin of a vehicle door when the door is in a closed position (6A) and when the door is in an open position (6B), according to one or more embodiments shown and described herein.
Figure 6B:
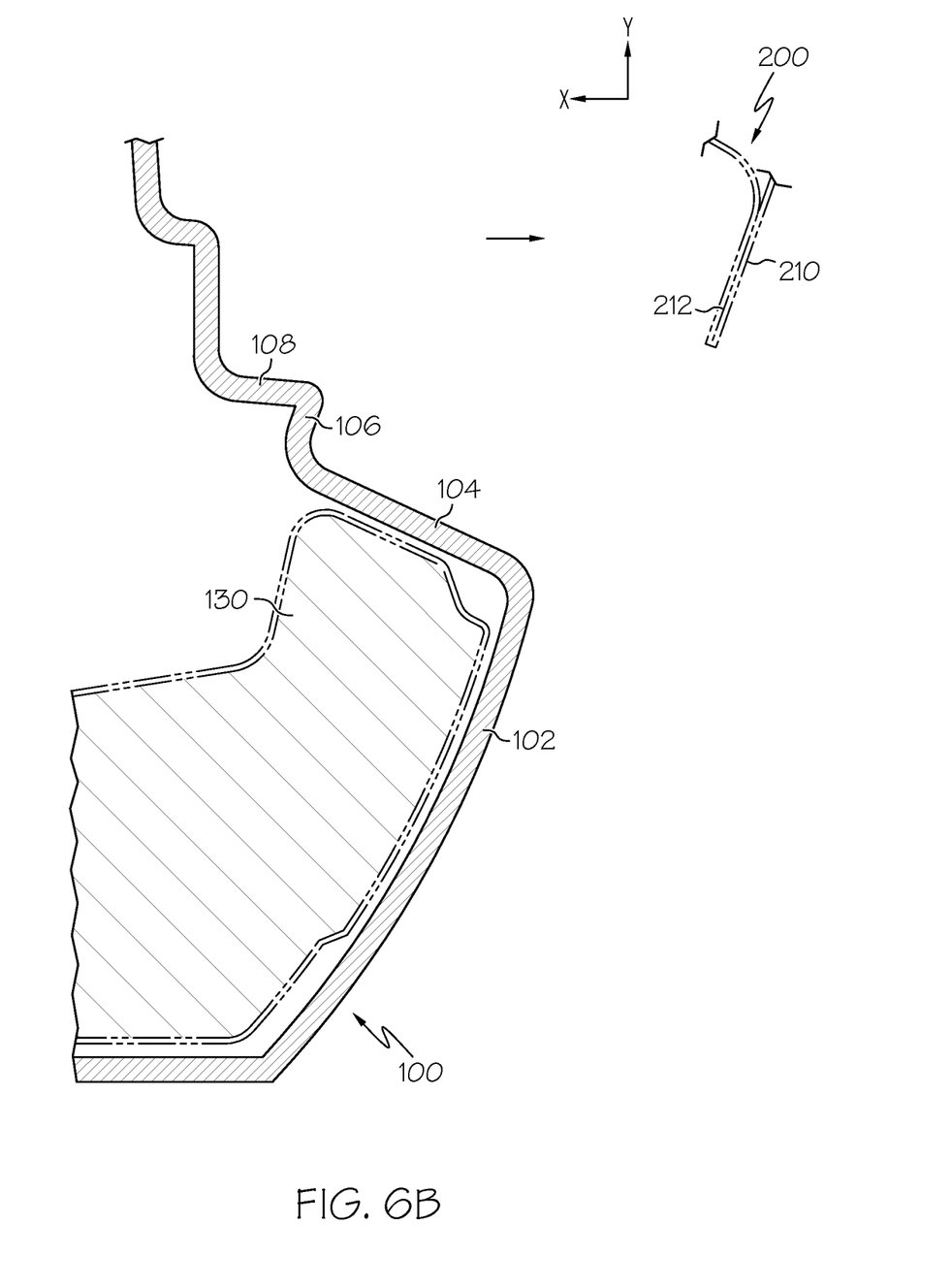

Referring now to FIGS. 1, 6A, and 6B, a cross section of the interface between a vehicle door 200 and the rocker molding 100 described herein is schematically depicted when the rocker molding 100 is installed on the rocker panel. Specifically, FIG. 6A depicts a vehicle door 200 in a closed position. As described in detail above, the rocker molding 100 generally comprises a rocker garnish 102, a garnish shelf 104, a riser portion 106, and a cap shelf 108. The vehicle door 200 comprises a vehicle door skin 210 on the outboard edge of the vehicle door 200. A weather strip 205 is attached to an inboard edge 214 of the vehicle door 200.

A lower edge 212 of the vehicle door skin 210 is spaced apart from the garnish shelf 104 by at least a height H of the riser portion 106. In the embodiment depicted in FIG. 6A, a gap G exists between the riser portion 106 and the lower edge 212 of the vehicle door skin 210 such that the lower edge 212 of the vehicle door skin 210 is spaced apart form the garnish shelf 104 by the sum of the height H of the riser portion 106 and the gap G. In the embodiments described herein, the gap G is in the range of about 5 mm to about 6 mm. However, while a gap G is depicted in the drawings, in some embodiments, there may be no gap between the riser portion 106 and the lower edge 212 of the vehicle door skin 210.

When the vehicle door 200 is in the closed position, as shown in FIG. 6A, the riser portion 106 is substantially flush with vehicle door skin 210. As used herein, the term "flush" means that the riser portion 106 and the lower edge 212 of the vehicle door skin 210 are co-planar and substantially parallel with one another. While the lower edge 212 of the vehicle door skin 210 is depicted as substantially parallel to the riser portion 106, it should be understood that the lower edge 212 of vehicle door skin 210 and the riser portion 106 may be substantially non-perpendicular in other embodiments. Similarly, while the lower edge 212 of the vehicle door skin 210 is depicted as substantially co-planar to the riser portion 106, the portion of the vehicle door skin 210 above the lower edge 212 may be contoured inboard or outboard.

Still referring to FIG. 6A, a lower edge 212 of the vehicle door skin 210 is positioned inboard and above the rocker garnish 102 and substantially parallel relative to the rocker garnish 102 when the vehicle door 200 is in the closed position. The lower edge 212 of the vehicle door skin 210 is positioned inboard and above the garnish shelf 104. As garnish shelf 104 extends substantially outboard, garnish shelf 104 is substantially perpendicular to the lower edge 212 of the vehicle door skin 210 when the vehicle door 200 is in the closed position. The lower edge 212 of the vehicle door skin 210 is positioned outboard and above the cap shelf 108. As cap shelf 108 extends substantially outboard, cap shelf 108 is substantially perpendicular to the lower edge 212 of the vehicle door skin 210 when the vehicle door 200 is in the closed position.

Referring now to FIG. 6B, the vehicle door 200 is depicted in an open position with respect to the rocker molding 100. When the vehicle door 200 is in an open position, the vehicle door skin 210 is located farther outboard of the rocker garnish 102, the garnish shelf 104, the riser portion 106, and the cap shelf 108 than when the vehicle door 200 is in the closed position, as depicted in FIG. 6A. As shown in FIG. 6B, the vehicle door skin 210 is not flush with the riser portion 106 because vehicle door skin 210 and riser portion 106 are not co-planar.

Due to the relative orientation and spacing of the lower edge 212 of the vehicle door skin 210 to the garnish shelf 104, the rocker moldings described herein facilitate opening the vehicle door 200 of the vehicle 500 with less force, particularly when ice and/or snow accumulates on the garnish shelf 104.

Figure 7A:
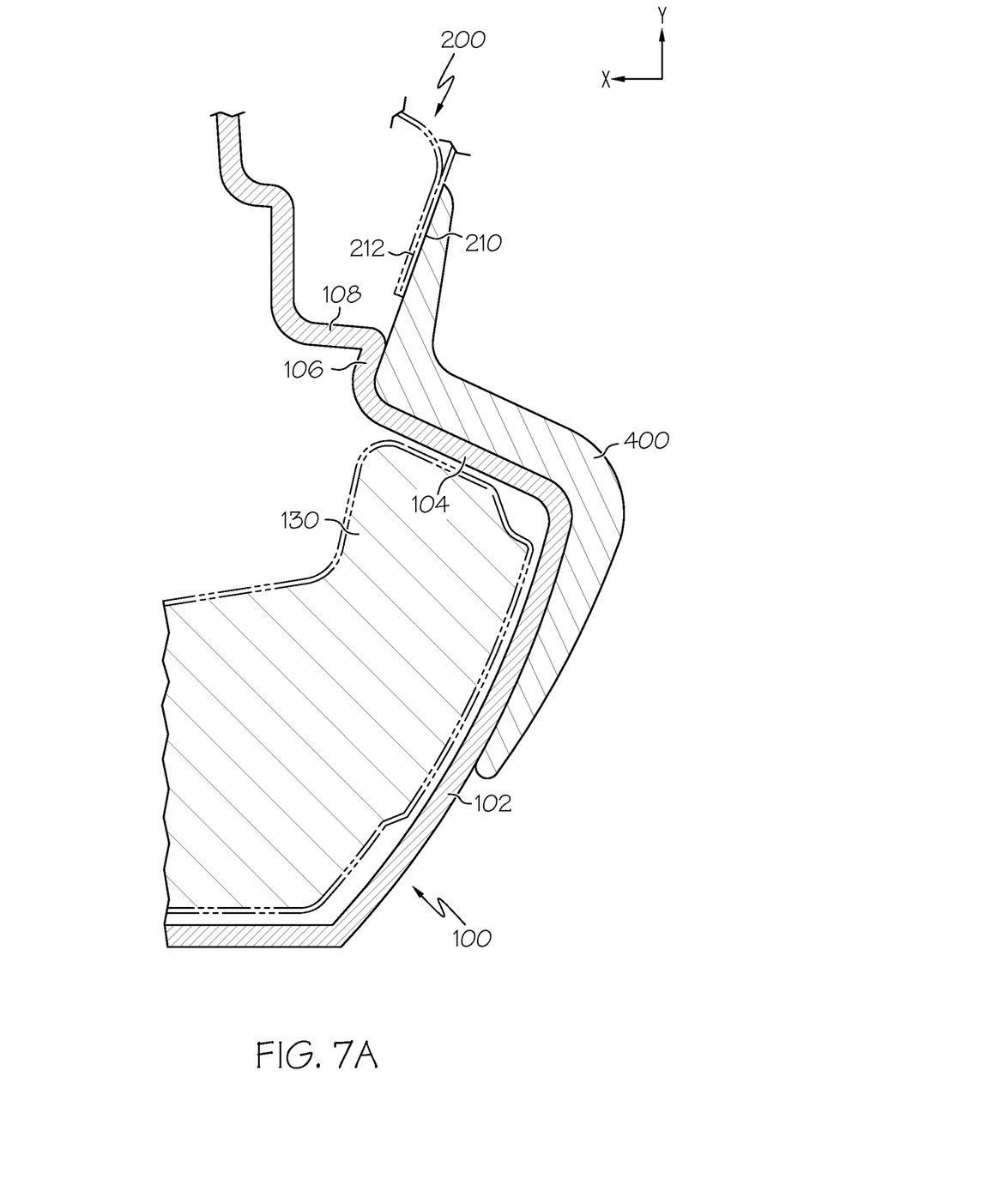
FIGS. 7A and 7B schematically depict cross sections of a rocker molding and a door skin of a vehicle door when the door is in a closed position with accumulated ice (7A) and when the door is in an open position after the ice has been broken (7B), according to one or more embodiments shown and described herein.
Figure 7B:
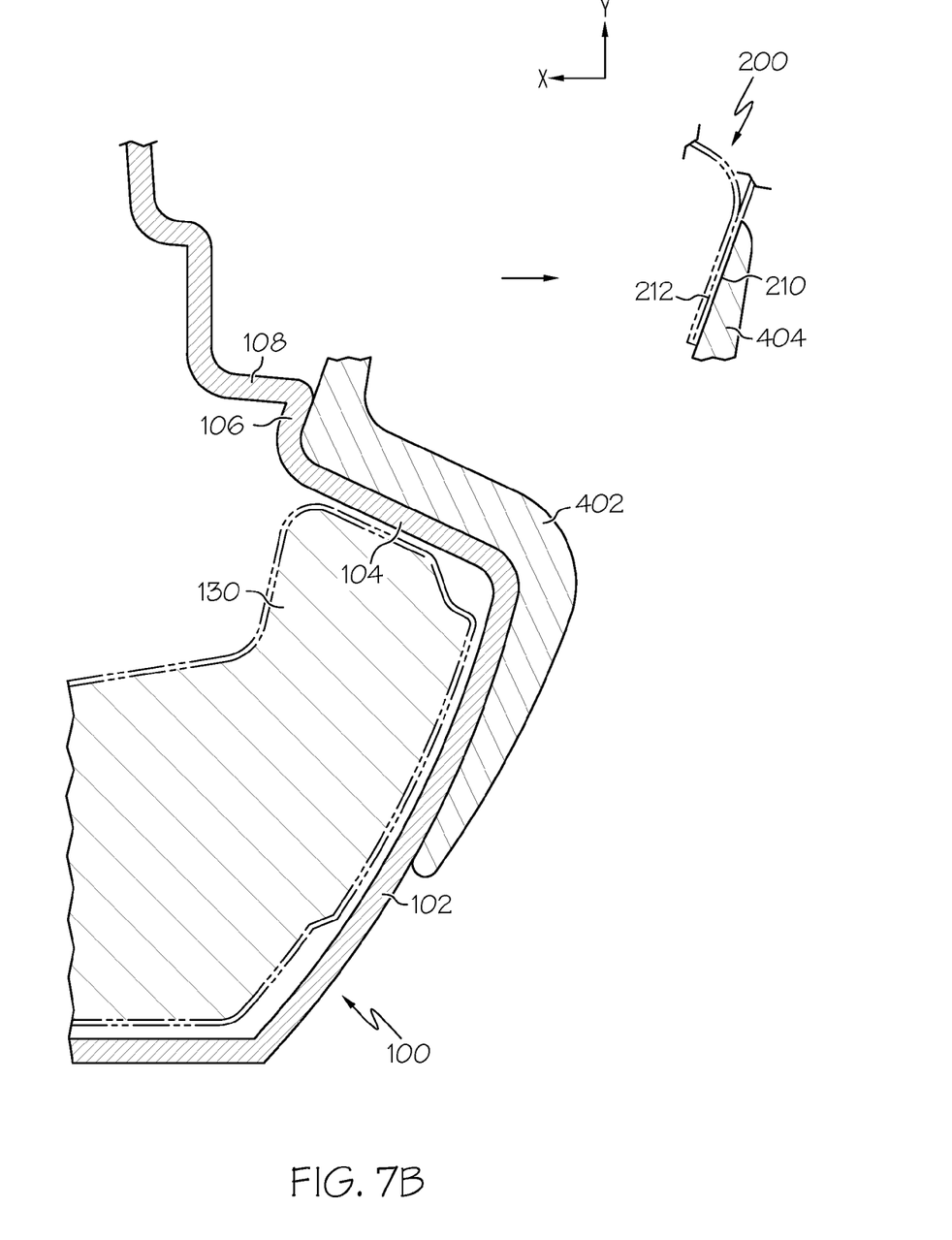

Referring now to FIGS. 7A and 7B, by way of example, a cross section of the interface between a vehicle door 200 and the rocker molding 100 described above is schematically depicted with ice accumulation on the garnish shelf 104 when the rocker molding 100 is installed on the rocker panel as described above. Specifically, when the vehicle is located in a cold environment, ice and/or snow accumulation 400 may build up on the rocker garnish 102, the garnish shelf 104, the riser portion 106, and the vehicle door skin 210. The ice and/or snow accumulation 400 inhibits the opening of the vehicle door 200 by an occupant of the vehicle or someone wishing to enter the vehicle. At least a portion of the ice and/or snow accumulation 400 may build up substantially in the direction of the riser portion 106 and the vehicle door skin 210, binding the vehicle door 200 to the riser portion 106.

FIG. 7B shows a vehicle door 200 that has been opened despite ice and/or snow accumulation. Opening the vehicle door 200 when the ice and/or snow accumulation has built up on the rocker molding 100 and the vehicle door 200, may break the ice and/or snow accumulation adjacent to the riser portion 106 rather than dislodging the ice and/or snow accumulation from the garnish shelf 104, which may require an even greater force. Specifically, a first portion 402 of ice and/or snow accumulation may remain attached to the rocker molding 100. As the vehicle door 200 is opened, a second portion 404 of ice and/or snow accumulation may break off from the first portion 402 of ice and/or snow accumulation and remain attached to the vehicle door skin 210 as the vehicle door 200 swings open.

It should now be understood that the rocker molding described herein may provide for easier opening of a vehicle door frozen to the rocker molding by ice and/or snow accumulation. An occupant already in the vehicle or a person wishing to enter the vehicle may more easily open a vehicle door when ice and/or snow has accumulated on the rocker molding described herein. A rocker molding comprising a riser portion that is substantially flush with a skin of a vehicle door and spaced apart from the garnish shelf when the door is in a closed position allows for an iced door to be opened by breaking the ice itself, rather than the bond between the ice and the rocker molding. Specifically, the force required to break the ice itself is typically less than the force that would be required to break the bond between the ice and the rocker molding, as may be required for a vehicle comprising a rocker molding with a structure other than that disclosed herein. The riser portion 106 facilitates applying a greater torque on the ice accumulation, allowing a frozen door to be more easily opened.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A rocker molding for attachment to a rocker panel of a vehicle, the rocker molding comprising:
   a rocker garnish having an arcuate cross section;
   a garnish shelf extending from an upper edge of the rocker garnish such that the garnish shelf is substantially perpendicular to the upper edge of the rocker garnish;
   a riser portion extending from an inboard edge of the garnish shelf in a substantially vertical direction; and
   a cap shelf extending from a top edge of the riser portion in an inboard direction, wherein, when the rocker molding is installed on the rocker panel of the vehicle:
      the garnish shelf extends from the rocker panel in an outboard direction;
      the riser portion is substantially flush with a skin of a vehicle door when the door is in a closed position; and
      a bottom edge of the vehicle door is spaced apart from the garnish shelf by at least a height H of the riser portion.

2. The rocker molding of claim 1 further comprising a first attachment flange and a second attachment flange, wherein:
   the rocker garnish extends between the first attachment flange and the second attachment flange, wherein the first attachment flange and the second attachment flange are substantially perpendicular to a length L of the rocker garnish;
   the garnish shelf extends at least partially between the first attachment flange and the second attachment flange; and
   the riser portion extends at least partially between the first attachment flange and the second attachment flange.

3. The rocker molding of claim 1, wherein a gap G separates the bottom edge of the vehicle door from the riser portion when the rocker molding is installed on the rocker panel of the vehicle and the vehicle door is in the closed position.

4. The rocker molding of claim 3, wherein the gap G is in the range from about 5 mm to about 6 mm.

5. The rocker molding of claim 1 further comprising a foam insert, wherein the foam insert is positioned on a back side of the rocker garnish.

6. The rocker molding of claim 1, wherein a depth D of the garnish shelf is about 25 mm.

7. The rocker molding of claim 1, wherein the height H of the riser portion is about 10 mm.

8. The rocker molding of claim 1, wherein the riser portion is substantially perpendicular to the garnish shelf.

9. A vehicle comprising a vehicle door, a rocker panel, and a rocker molding for attachment to the rocker panel of the vehicle, the rocker molding comprising:
   a rocker garnish having an arcuate cross section;
   a garnish shelf extending from an upper edge of the rocker garnish such that the garnish shelf is substantially perpendicular to the upper edge of the rocker garnish;
   a riser portion extending from an inboard edge of the garnish shelf in a substantially vertical direction; and
   a cap shelf extending from a top edge of the riser portion in an inboard direction, wherein, when the rocker molding is installed on the rocker panel of the vehicle:
      the garnish shelf extends from the rocker panel in an outboard direction;
      the riser portion is substantially flush with a skin of the vehicle door when the door is in a closed position; and
      a bottom edge of the vehicle door is spaced apart from the garnish shelf by at least a height H of the riser portion.

10. The vehicle of claim 9, wherein the rocker molding further comprises a first attachment flange and a second attachment flange, wherein:
   the rocker garnish extends between the first attachment flange and the second attachment flange, wherein the first attachment flange and the second attachment flange are substantially perpendicular to a length L of the rocker garnish;
   the garnish shelf extends at least partially between the first attachment flange and the second attachment flange; and
   the riser portion extends at least partially between the first attachment flange and the second attachment flange.

11. The vehicle of claim 9, wherein a gap G separates the bottom edge of the vehicle door from the riser portion.

12. The vehicle of claim 9, wherein the rocker molding further comprises a foam insert wherein the foam insert is positioned on a back side of the rocker garnish.

13. The vehicle of claim 9 further comprising a plurality of attachment tabs coupled to an inboard side of the rocker molding for attaching the rocker molding to the rocker panel of the vehicle.

14. The vehicle of claim 9 further comprising a connector box pivotably attached to a lower edge of the rocker garnish for movement relative to the rocker garnish.

15. A vehicle comprising a vehicle door, a rocker panel, and a rocker molding for attachment to the rocker panel of the vehicle, the rocker molding comprising:
   a rocker garnish having an arcuate cross section;
   a connector box pivotably attached to a lower edge of the rocker garnish for movement relative to the rocker garnish;
   a garnish shelf extending from an upper edge of the rocker garnish such that the garnish shelf is substantially perpendicular to the upper edge of the rocker garnish;
   a riser portion extending from an inboard edge of the garnish shelf in a substantially vertical direction;
   a plurality of attachment tabs positioned on an inboard side of the rocker molding for attaching the rocker molding to the rocker panel of the vehicle; and
   a cap shelf extending from a top edge of the riser portion in an inboard direction, wherein, when the rocker molding is installed on the rocker panel of the vehicle:
      the garnish shelf extends from the rocker panel in an outboard direction;
      the riser portion is substantially flush with a skin of the vehicle door when the door is in a closed position; and
      a bottom edge of the vehicle door is spaced apart from the garnish shelf by at least a height H of the riser portion.

16. The vehicle of claim 15 further comprising a first attachment flange and a second attachment flange, wherein:
   the rocker garnish extends between the first attachment flange and the second attachment flange, wherein the first attachment flange and the second attachment flange are substantially perpendicular to a length L of the rocker garnish;
   the garnish shelf extends at least partially between the first attachment flange and the second attachment flange; and
   the riser portion extends at least partially between the first attachment flange and the second attachment flange.

17. The vehicle of claim 15, wherein a living hinge pivotably attaches the connector box to the lower edge of the rocker garnish.

18. The vehicle of claim 15, wherein a gap G separates the bottom edge of the vehicle door from the riser portion when the rocker molding is installed on the rocker panel of the vehicle and the vehicle door is in the closed position.

19. The vehicle of claim 18, wherein the gap G is in the range from about 5 mm to about 6 mM.

20. The vehicle of claim 15 further comprising a foam insert, wherein the foam insert is positioned on a back side of the rocker garnish.

* * * * *